United States Patent
Moon (10) Patent No.: US 10,003,697 B2
(45) Date of Patent: Jun. 19, 2018

(54) SELECTIVE TARGETING FOR SPONSORED DATA SERVICES

(71) Applicant: Verizon Patent and Licensing Inc., Arlington, VA (US)

(72) Inventor: Hannah Y. Moon, Boston, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 252 days.

(21) Appl. No.: 14/940,627

(22) Filed: Nov. 13, 2015

(65) Prior Publication Data

US 2017/0142264 A1    May 18, 2017

(51) Int. Cl.
*H04M 11/00* (2006.01)
*H04M 15/00* (2006.01)

(52) U.S. Cl.
CPC ....... *H04M 15/8083* (2013.01); *H04M 15/47* (2013.01); *H04M 15/755* (2013.01)

(58) Field of Classification Search
CPC ..... H04W 12/08; H04W 12/06; H04W 12/10; H04W 12/12; H04W 36/24; H04W 4/00; H04W 4/001; H04W 4/003; H04W 4/02; H04W 4/04; H04M 15/58
See application file for complete search history.

(56) References Cited

U.S. PATENT DOCUMENTS

| | | | | |
|---|---|---|---|---|
| 2002/0176377 A1* | 11/2002 | Hamilton | .................. | G06F 3/16 370/278 |
| 2002/0176378 A1* | 11/2002 | Hamilton | ................ | H04L 12/66 370/328 |
| 2010/0332304 A1* | 12/2010 | Higgins | ................ | G06Q 30/02 705/14.16 |
| 2015/0011182 A1* | 1/2015 | Goldner | ................ | H04M 15/66 455/406 |
| 2016/0203520 A1* | 7/2016 | Das | .................... | G06Q 30/0267 705/14.64 |

\* cited by examiner

*Primary Examiner* — Khalid Shaheed (57) ABSTRACT

Methods and devices provide access to a sponsored data service (SDS) via a mobile device. A method may include receiving information identifying attributes to ascertain whether a user qualifies to access sponsored data, where an attribute from the identified attributes may include a position of the mobile device or a time of access to the SDS. The method may include determining parameters associated with the attributes. The method may further include sending the parameters to a validation device, where the validation device determines, based on the parameters, whether the user qualifies to receive sponsored data. The method also includes receiving a network address from the validation device, in response to the validation device determining that the user qualifies to receive sponsored data, and accessing sponsored data from a device associated with the network address.

20 Claims, 7 Drawing Sheets

SELECTIVE TARGETING FOR SPONSORED DATA SERVICES

BACKGROUND

Access to wireless communication networks and data services typically involves some form of payment by the user of a mobile device. Some forms of access include a service plan that involves a contractual arrangement having a limited amount of data usage over a set period of time (e.g., such limits may be enforced by "data caps"). In other instances, a third party may wish to sponsor a user's data consumption for particular types of promotions in order to entice user engagement. Because the sponsored data does not count against a service plan's data caps, a user is more likely to participate in data transactions supported by sponsored data services. However, because access to conventional sponsored data may be unrestricted as to access, supporting sponsored data services may be very costly to sponsors given the large amounts of data which may be consumed.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to approaches for the selective targeting of users for sponsored data services (SDSs). An SDS may be defined as a data networking service that is financially supported by a third party entity. The third party entity, hereinafter referred to as a "sponsor," subsidizes the network data exchanged between a mobile device and a specified content provider. The sponsor may have a relationship with the network provider that permits the automatic billing of the sponsor for the exchanged data, instead of assigning the costs to the user of the mobile device. Thus, the data exchanged through the SDS (which may also be referred to herein as "sponsored data" or "sponsored content") is effectively "toll-free" as seen by the user of the mobile device. The sponsored data may be accessed (e.g., downloaded, streamed, etc.) by the mobile device from the specified content provider, and/or uploaded from the mobile device to the specified content provider. In some embodiments, the sponsor and the content provider may be the same entity. In other embodiments, the sponsor may rely upon a third party to provide content, for which the sponsor may compensate the third party, either directly or through the network provider.

As sponsors bear the financial burden for providing content, the total costs for providing sponsored content generally increases as more users obtain access. The costs for sponsored content may include charges based on network bandwidth and/or data amounts consumed, costs associated with hosting devices themselves and their operation, such as, for example hardware and/or software costs, colocation fees, electricity usage costs, and/or cloud service fees. Moreover, additional fees may be incurred for content production, licensing, publication, and/or broadcasting rights of multimedia content. Thus, such costs may become significant as more users access the sponsored content, and high costs may impede smaller organizations from offering sponsored content.

Embodiments provided herein offer approaches to control SDS access by selectively targeting users for sponsored content, thus effectively controlling costs. Therefore, instead of providing open access to all customers which access an organization's web site and/or applications, the organization may offer sponsored data to a reduced number of users based on one or more criteria (referred to herein as "attributes"). The attributes may target users that may be more relevant customers for a sponsor's products and/or services, thus having the simultaneous benefit of reducing cost and increasing the efficiency of a sponsor's marketing efforts. Such attributes may include, for example, a position of a mobile device being used to access the sponsored content, a time and/or date indicating when the sponsored content is being accessed, the amount of data a user has allocated within a current billing period, an identification of the device from which the user is accessing sponsored content, etc. Each attribute may have one or more associated parameters which specifies the attribute. For example, an attribute such as "DEVICE POSITION" may be associated with three numerical parameters describing the position of a mobile device in, for example, global positioning system (GPS) coordinates latitude, longitude, and altitude. Thus, an attribute may be thought of as a variable name defined by a descriptive text label, and the parameter is a value associated with the variable name, which may be any data type, and may include, for example, text data, numerical data, logical data, etc.

For example, in an embodiment, a start-up company that specializes in sports memorabilia may wish to reach potential customers by offering sponsored content. To target appropriate customers, the start-up company wishes to associate their sponsorship with an upcoming Boston Red Sox and New York Yankees baseball game occurring July 10 at 7:10 p.m., where customers may receive a broadcast of the game with special simulcast programming that may include exclusive "behind-the-scenes" coverage, game analysis, interviews, fantasy baseball tie-ins, etc. Prior to the game, the start-up company may inform the network provider that they wish to offer sponsored content to customers which are: 1) in the physical vicinity of the game location; 2) between 6:00 pm and 10:00 pm on July $10^{th}$; and 3) to customers only having 10% remaining of their monthly data allotment on their service plans. In one embodiment, the start-up company may further limit its costs by specifying a maximum number of users (e.g., 500 customers) which may access the sponsored data. Upon the set time at 6:00 pm, only mobile devices that match the above-mentioned parameters (and only those devices), are offered the sponsored data deal from the start-up company.

Figure 1:
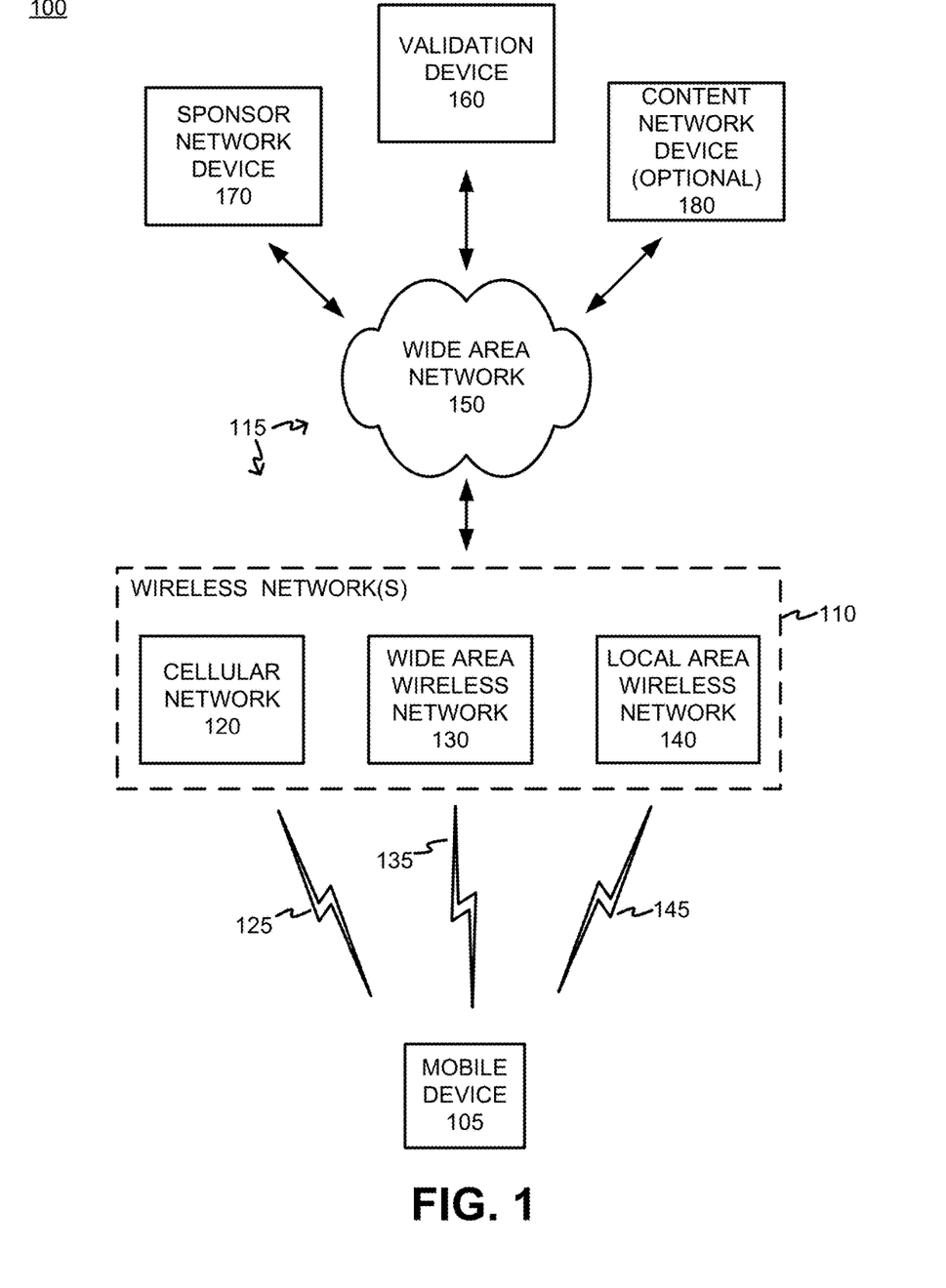
FIG. 1 is a block diagram of an exemplary network environment for providing sponsored data services.

FIG. 1 is a block diagram of an exemplary network environment 100 for providing sponsored data services according to an embodiment. Environment 100 may include one or more mobile device(s) 105, network 115, a validation device 160, a sponsor network device 170, and an optional content network device 180. Network 115 may include one or more wireless network(s) 110 and a wide area network 150. Wireless networks 110 may further include, for example, a cellular network 120, a wide area wireless network 130, and/or a local area wireless network 140. For ease of explanation, only one mobile device 105, validation device 160, sponsor network device 170, and content network device 180 are illustrated as being connected to network 115. However, it should be understood that a plurality of mobile devices 105, validation devices 160, sponsor network devices 170, content network devices 180, and/or other known network entities may be communicatively coupled to network 115. FIG. 1 depicts a representative environment 100 with exemplary components and configuration shown for purposes of explanation. Other embodiments may include additional or different network entities in alternative configurations than which are exemplified in FIG. 1.

Mobile device 105 may obtain access to network 115 through wireless network(s) 110 over any type of known radio channel or combinations thereof. For example, mobile device 105 may access any cellular network 120 over wireless channel 125. Access over wireless channel 125 may be provided through a base station, eNodeB, etc., within cellular network 120, as will be described in more detail below in reference to an embodiment shown in FIG. 2. In various embodiments, cellular network 120, wide area wireless network 130, and/or local area wireless network 140 may also communicate with each other in addition to mobile device 105. Mobile device 105 may also access network 115 over wireless channel 135 through wide area wireless network 130. Wide area wireless network 130 may include any type wireless network covering larger areas, and may include a mesh network (e.g., IEEE 801.11s) and/or or a WiMAX IEEE 802.16. Mobile device 105 may access network 115 over wireless channel 145 through local area wireless network 140, which may include WiFi (e.g., any IEEE 801.11x network, where x=a, b, g, n, and/or ac). The wireless network(s) 110 may exchange data with wide area network 150 that may include backhaul networks, backbone networks, and/or core networks. Validation device 160, sponsor network device 170, and/or content network device 180 may interface with wide area network 150, and thus with mobile device 105 over one or more of the air interfaces 125, 135, 145 through wireless network(s) 110.

Mobile device 105 may obtain SDS access to network 115 over one or more air interfaces 125, 135, and/or 145, which may be supported by the sponsor to provide sponsored content to mobile device 105. In one embodiment, the sponsored content may be hosted and provided directly by the sponsor network device 170 over network 115. In another embodiment, where the sponsor may not have sufficient computer and/or network resources to store and/or provide the sponsored content, the sponsor may utilize content network device 180 to host and serve the sponsored content to mobile device 105. For instance, in the example provided above where baseball content is sponsored by the start-up company specializing in sports memorabilia, the content may be provided through applications and/or websites owned and/or operated, for example, by the American League/Major League Baseball (MLB), instead of the start-up company. Thus, the start-up company reimburses the American League/MLB for the cost of the data provided by their sponsorship, which would be less costly than having the start-up company host and provide the sponsored data using their own computer and networking resources. In other embodiments, where a high demand for sponsored content may be anticipated, the sponsored content may be supplied by both sponsored network device 170 and content network device 180 to meet demands. For example, one or more content network devices 180 may be used to balance server and/or network loads when needed.

As used herein, content may also be referred to herein as "media," and may include any type of digital data representing user-interpretable information, including text, image, audio, and/or video data. Media may also include one or more combinations of any type of digital data that may be blended, arranged, and presented to the user, such as, for example, in the form of webpages described using hypertext markup language (HTML). Media may also be provided in the context of software applications residing on mobile device 105. The software applications may include stand-alone applications which may be downloaded from an "app store" or loaded from separate media. Alternatively, the applications may be run in a web browser, email client, etc., in the form of JavaScript code, as "plug-ins," and/or extensions. Connections for sponsored data exchanges may be established by sponsors who may arrange access for particular events and/or promotions (which may be referred to herein as "campaigns"). The campaigns may be arranged through a portal network device assigned by the network provider (e.g., a web portal under control of the network provider). In one embodiment, the portal network device used to arrange campaigns may be validation device 160.

When arranging a campaign, the sponsor may set various parameters for the campaign and include attributes and threshold parameters, as noted above, and may further include other information such as, for example, media specification for content, time duration, maximum number of users, maximum allotment of data, etc. The sponsor may further provide one or more network addresses for accessing sponsored data, and sponsor identifiers which may be used to specify the accounts used for billing. The network address can identify the network locations for one or more sponsor network device(s) 170 and/or one or more content network device(s) 180, which may act as repositories and/or distribution devices for media.

In an embodiment, the portal network device may generate the network address (e.g., a toll free URL) from information provided by the sponsor during the creation of the campaign. The generated network addresses may contain special network destination information (e.g., the location of a third party content network device 180), security information (e.g., a signature, token, key, etc.), and/or additional parameters that are used by the network provider backend in, for example, the data accounting and/or billing processes.

With mobile device 105, mobile applications and/or webpages downloaded through a mobile browser may use one or more software development kits that support the SDS. Such mobile applications and/or websites may access sponsored content (e.g., download, stream, etc.) by making network requests using the appropriate network addresses. The SDS requests may be intercepted by the network provider's existing service platform backend infrastructure, which may track accessed SDS data and bill the sponsor for the cost of the data used by the campaign.

In order to access the specified content provider and ensure that the sponsor is billed for the sponsored data exchange, a specific network address may be used as a network address for a content network device. In an embodiment, the hyper-text transfer protocol (HTTP) may be used to exchange the data, so the network address may take the form of a sponsored data service universal resource locator (URL) (hereinafter referred to as an "SDS_URL" or a "toll free URL").

The following is an example of how the SDS may be used in a movie promotion/campaign for a targeted set of users. Mobile applications, such as, for example, Fandango, may be used to investigate movies playing at local movie theaters, the ratings of the movies, and/or the specific times when the movies are being shown. A user may be running Fandango on mobile device 105 to search movies currently playing in local theaters. A movie promoter, for example, may sponsor data which may be presented through the Fandango application for downloading movie previews, reviews, and/or digital coupons. In order to effectively target the marketing effort, the sponsor may be interested in a particular user demographic for the movie it is promoting, which it may target based upon one or more attributes associated with the user and/or mobile device 105. For example, the sponsor may be interested in reaching users within a local range of particular theaters during Friday and Saturday evenings between 7:00 pm and 10:00 pm. Accordingly, either in response to running the Fandango application and/or the state of mobile device 105 (e.g., the general location of mobile device 105), validation device 160, via network 115, may send information identifying attributes to mobile device 105 which may be used to target users for which the sponsor wishes to reach with its promotion.

In this example, the attributes may include a precise position of mobile device 105 in relation to a particular theater, and the day and time in which the user is accessing the Fandango application. Once mobile device 105 receives the information identifying the attributes requesting position, day, and time, mobile device 105 may send back parameters matching requested attributes, for example, GPS position, date, and time values, to validation device 160.

Validation device 160 may further use additional attributes associated with the user's account, such as the type of data plan (e.g., unlimited, family plan, etc.) to determine whether the user should qualify for sponsored content. For example, if the user is nearing the end of her allotted minutes for the month on her data plan, validation device 160 would provide sponsored data to encourage user participation in the sponsor's promotion. Once validation device 160 determines the user is qualified to receive sponsored data, validation device 160 may provide the SDS_URL to mobile device 105 so it may access the sponsored data. The SDS_URL may point to data hosted by sponsored network device 170 and/or content network device 180. The sponsored data may include movie clips requested by the user, thus stimulating interest in the movie promotion. Through the use of sponsored data, the user may be more willing to use the mobile application without having to worry about hitting the data caps associated with the user's wireless service plan. By shifting the cost of data away from the user using the SDS, the mobile application will receive more use, and thus increase number of movie promotions viewed, and drive the sales of movie tickets. By targeting specific users in the manner described above, the cost of the sponsored data to the sponsor is effectively managed and the marketing effort is more efficiently implemented.

Further referring to FIG. 1, mobile device 105 may include any type of electronic device having communication capabilities, and thus communicate over network 115 using a variety of different channels, including both wired and wireless connections. Mobile device 105 may include, for example, a cellular radiotelephone, a smart phone, a wearable computer (e.g., a wrist watch, eye glasses, etc.), a tablet, a set-top box (STB), a mobile phone, any type of IP communications device, a Voice over Internet Protocol (VoIP) device, a laptop computer, a palmtop computer, a gaming device, a media player device, or a digital camera that includes communication capabilities (e.g., wireless communication mechanisms).

Wireless network(s) 110 may include one or more wireless networks of any type, such as, for example, a local area network (LAN), a wide area network (WAN), a wireless satellite network, and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Wide area network 150 may be any type of wide area network connecting backhaul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Validation device 160 may be any type of network device, such as, for example, a server, computer, etc., that qualifies a user associated with mobile device 105 to receive sponsored content. The determination as to whether the user/ mobile device 105 may qualify to receive data through the SDS may be based on one or more attributes associated with the user and/or mobile device 105. The attributes may be associated with mobile device 105 and/or with the identity/ meta data associated with the user, and/or information derived from the network provider, which may include aspects of the user's wireless subscription plan with the network. Desired attributes associated with mobile device 105 may be specified by the sponsor via sponsor network device 170 and communicated to validation device 160 for transmission to mobile device 105. When validation device 160 determines that a set of indicated attributes match, or are within a threshold, of their associated parameters for a particular user and mobile device 105, validation device 160 may designate the user of mobile device 105 a valued marketing target and qualify the user to receive sponsored content at mobile device 105. In doing so, validation device 160 may provide a network address (e.g., an SDS URL) to the source of the sponsored content. The source of the sponsored content may include sponsor network device 170 and/or content network device 180. Validation device 160 may provide additional information to mobile device 105 in the form of an SDS identifier that may, along with network address, include sponsor account identification, a network address for third party payment, a security signature, parameters for data accounting, and/or parameters for billing the requested sponsored data.

Sponsor network device 170 may be any type of network device, such as, for example, a server, computer, etc., associated with or under control of the sponsor, and may be used to specify a marketing campaign which designates a profile of a target customer. Additionally, in an embodiment, sponsor network device 170 may also provide sponsored content to mobile device 105. Sponsor network device 170 may specify a marketing campaign by indicating specific attributes associated with mobile device 105, the user, and/or the wireless networking plan associated with the user. Each attribute may be associated with one or more numerical, logical, and/or text parameters. The attributes may be provided by sponsor network device 170 to validation device 160. Validation device 160, which may typically be under control of the network provider, may evaluate the attributes and their associated parameters to determine whether the user qualifies to receive sponsored content via the SDS.

The attributes may include specific attributes associated with mobile device 105, and parameters associated with these attributes may be determined by mobile device 105 itself. Such attributes may include: a position of mobile device 105, a proximity of mobile device 105 to a specified location, a time of access to the SDS, a day/date of access to the SDS, capabilities of mobile device 105 (e.g., processor, memory, operating system, wireless networking capabilities, etc.), a make and/or model identification of mobile device 105, an identification of applications residing on mobile device 105, types of wireless networking channels available to mobile device 105, internet browsing history, user purchasing, buying history, information residing in identified applications, and/or identification of clubs, groups, and/or organizations associated with a user which may be stored in mobile device 105. Other attributes may include network-centric attributes associated with the user and/or the network plan of the user. The parameters of such attributes may be determined by devices with network 115 having databases associated with user accounts and other information, which may communicate relevant parameters to validation device 160. Such network-centric attributes may include an identity and/or a type of a plan to which the user is subscribed, an amount of data available in the plan for a current billing period, whether the user is a home subscriber to the network, whether the user has credits or coupons associated with plan, and/or whether there is a limit on a total number of number of users having access to the SDS and/or the total amount of data which may be accessed (downloaded, streamed, and/or otherwise exchanged) via the SDS.

The attributes and their associated parameters may be obtained through one or more software based interfaces that would be incorporated into both mobile device 105 software and software residing on network devices within network 115 (e.g., various backend network servers, sponsor network device 170, and/or validation device 160). For example, mobile device 105 information, such as the location of mobile device 105, the time of day, and an identification of mobile device 105 in which the user is accessing sponsored content may be communicated through a network application programming interface (API) to validation device 160 (or any other backend server). One or more APIs may reside within mobile device 105 to determine the parameters for various attributes and states of mobile device 105 (such as, for example, position, time of day, device capabilities). APIs within mobile device 105 may also provide information regarding the type and/or identification of applications present on mobile device 105, and may further provide information generated by and/or resident within the application, depending upon privacy settings associated with application(s) and/or an operating system residing on mobile device 105. For example, an API may provide the information that the Facebook application resides on mobile device 105, and may further provide information stored within the Facebook app, such as, for example, the user's status, friends of the user, groups to which the user belongs, feeds to which the user subscribes, etc. APIs may send device information to the network, e.g., to validation device 160, to determine a user's qualifications for receiving sponsored data.

APIs may also reside on the network provider side to determine, for example, user account status, plan details, etc. For example, validation device 160 may utilize one or more APIs to obtain account information regarding the user's data plan (e.g., how much data a user's account has left within their month's data allotment). Using an algorithm to combine attributes determined by the mobile APIs, and further to parse attributes and their associated parameters with customer accounts, a sponsored data deal may be determined and offered to the user's mobile device 105 based on the correct device identifier as specified in the user's customer accounts records and/or the identification information verifying the user's mobile device 105 (e.g., as found within a secure element module described below in relation to FIG. 3).

Further referring to FIG. 1, content network device 180 may be any type of network device (e.g., a web server, computer, media repository, streaming source, etc.) that may respond to requests to provide any type of content or media. Content network device 180 may store and provide any type of media, such as, for example, text, audio, image, video, software code, etc. Alternatively, content network device 180 may be, or provide a connection to, another communications provider (e.g., other wireless carrier, over the top (OTT) service, etc.), and thus provide mobile device 105 with voice, text, and/or video communications from other sources outside the control of the network service provider. Content network device 180 may be a third party device which may be optionally used instead of, or in association with, sponsor network device 170, to host and provide sponsored content to mobile device 105.

Figure 2:
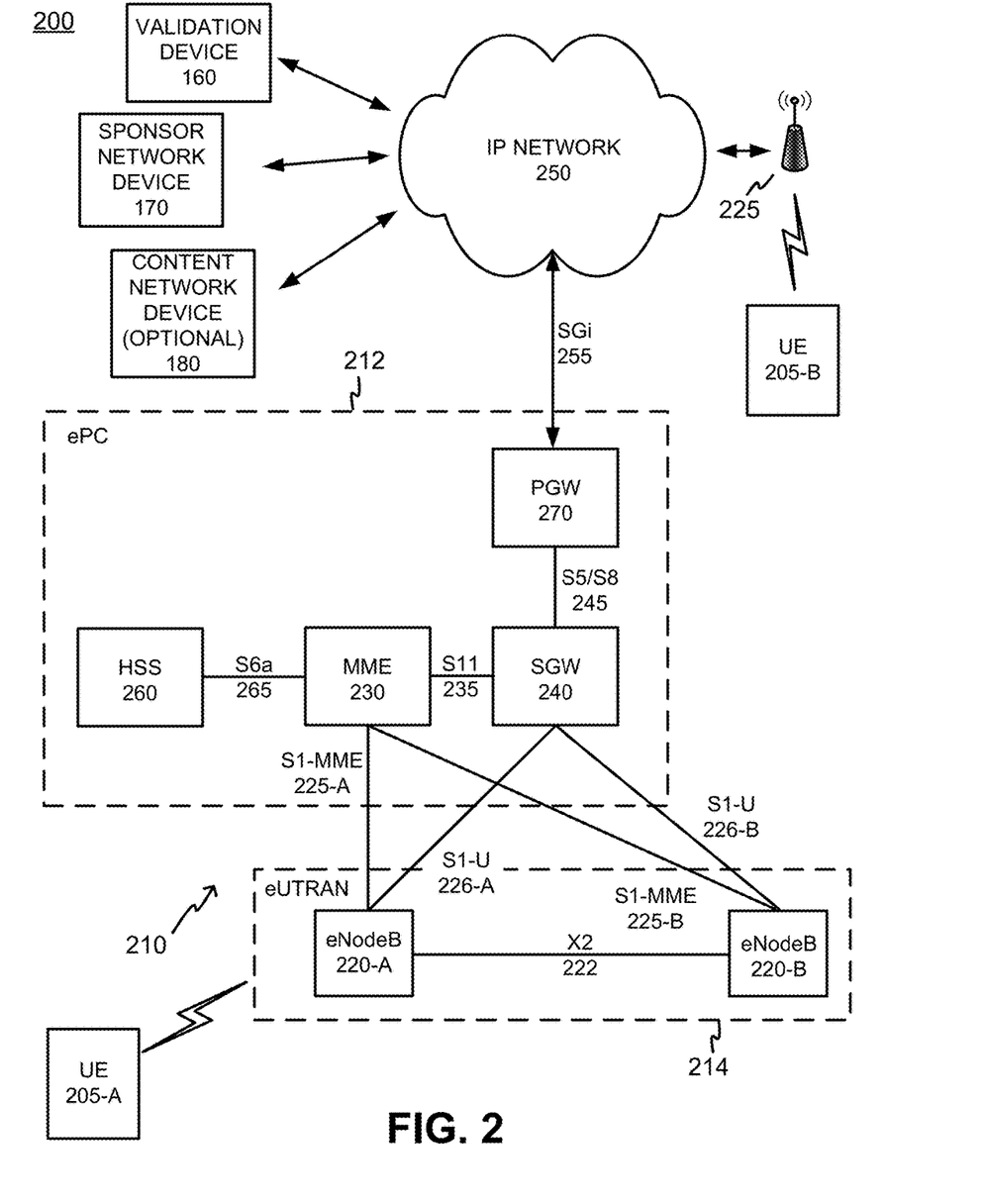
FIG. 2 is a block diagram of an exemplary wireless network which supports sponsored data services.

FIG. 2 is a block diagram of an exemplary networking system 200 that provides a selective targeting SDS over various types of wireless channels. As shown in FIG. 2, networking system 200 may include mobile devices 105 embodied as user equipment (UE) 205-A and UE 205-B (as used herein, collectively referred to as "UE 205" and individually as "UE 205-$x$"), a wireless network 210 which includes an evolved Packet Core (ePC) 212 and an evolved UMTS Terrestrial Network (eUTRAN) 214, an Internet Protocol (IP) network 250, a WiFi wireless access point (WAP) 225, validation device 160, sponsor network device 170, and optional content network device 180. Wireless network 210 may correspond to, or be a component of, cellular network 120 within wireless network(s) 110.

Wireless network 210 may be a long term evolution (LTE) network, and include one or more devices that are physical and/or logical entities interconnected via standardized interfaces. Wireless network 210 provides wireless packet-switched services and wireless IP connectivity to user devices to provide, for example, data, voice, and/or multimedia services. The ePC 212 may further include a mobility management entity (MME) 230, a serving gateway (SGW) device 240, a packet data network gateway (PGW) 270, and a home subscriber server (HSS) 260. The eUTRAN 214 may further include one or more eNodeBs 220-A and 220-B (herein referred to collectively as "eNodeB 220" and individually as "eNodeB 220-$x$"). It is noted that FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, each eNodeB 220 may include one or more devices and other components having functionality that allow UE 205 to wirelessly connect to eUTRAN 214. eNodeB 220 may interface with ePC 212 via a S1 interface, which may be split into a control plane S1-MME interface 225-A and a data plane S1-U interface 226-B. S1-MME interface 225-A may interface with MME device 230. S1-MME interface 225-A may be implemented, for example, with a protocol stack that includes a Network Access Server (NAS) protocol and/or Stream Control Transmission Protocol (SCTP). S1-U interface 226-B may interface with SGW 240 and may be implemented, for example, using a General Packet Radio Service Tunneling Protocol version 2 (GTPv2). eNodeB 220-A may communicate with eNodeB 220-B via an X2 interface 222. X2 interface 222 may be implemented, for example, with a protocol stack that includes an X2 application protocol and SCTP.

MME device 230 may implement control plane processing for ePC 212. For example, MME device 230 may implement tracking and paging procedures for UE 205, may activate and deactivate bearers for UE 205, may authenticate a user of UE 205, and may interface to non-LTE radio access networks. A bearer may represent a logical channel with particular quality of service (QoS) requirements. MME device 230 may also select a particular SGW 240 for a particular UE 205. A particular MME device 230 may interface with other MME devices 230 in ePC 212 and may send and receive information associated with UEs, which may allow one MME device to take over control plane processing of UEs serviced by another MME device, if the other MME device becomes unavailable.

SGW 240 may provide an access point to and from UE 205, may handle forwarding of data packets for UE 205, and may act as a local anchor point during handover procedures between eNodeBs 220. SGW 240 may interface with PGW 270 through an S5/S8 interface 245. S5/S8 interface 245 may be implemented, for example, using GTPv2.

PGW 270 may function as a gateway to IP network 250 through a SGi interface 255. IP network 250 may include, for example, an IP Multimedia Subsystem (IMS) network, which may provide voice and multimedia services to UE 205, based on Session Initiation Protocol (SIP). A particular UE 205, while connected to a single SGW 240, may be connected to multiple PGWs 270, one for each packet network with which UE 205 communicates.

Alternatively, UE 205 may exchange data with IP network 250 though WiFi wireless access point (WAP) 225. The WiFi WAP 225 may be part of a local area network, and access IP network 250 through a wired connection via a router. Alternatively, WiFi WAP 225 may be part of a mesh network (e.g., IEEE 801.11s). WiFi WAP 225 may be part of a local area network, or part of a wide area network (WiMaxx) or a mesh network (IEEE 801.11s).

MME device 230 may communicate with SGW 240 through an S11 interface 235. S11 interface 235 may be implemented, for example, using GTPv2. S11 interface 235 may be used to create and manage a new session for a particular UE 205. S11 interface 235 may be activated when MME device 230 needs to communicate with SGW 240, such as when the particular UE 205 attaches to ePC 212, when bearers need to be added or modified for an existing session for the particular UE 205, when a connection to a new PGW 270 needs to created, or during a handover procedure (e.g., when the particular UE 205 needs to switch to a different SGW 240).

HSS device 260 may store information associated with UEs 205 and/or information associated with users of UEs 205. For example, HSS device 260 may store user profiles that include authentication and access authorization information. MME device 230 may communicate with HSS device 260 through an S6a interface 265. S6a interface 265 may be implemented, for example, using a Diameter protocol.

Validation device 160 may exchange information using a standard TCP/IP interface with IP network 250, and further communicate with ePC 212 using SGi 255. Communications between validation device 160 and UEs 205 may be performed through ePC 212 and eUTRAN 214 as shown for UE 205-A, or through WiFi WAP 225 as shown for UE 205-B. The communications between validation device 160 and UE 205 may be channel agnostic, and thus may be performed using any known wireless and/or wired channels, or combinations thereof. Accordingly, other methods for communication between validation device 160 and UE 205 may be used which are not illustrated in FIG. 2.

Sponsor network device 170 may exchange information with other network devices, such as, for example, validation device 160 and/or content network device 180, using a standard TCP/IP interface with IP network 250, and further communicate with ePC 212 using SGi 255. Sponsor network device 170 may also be any type of web server, media repository, streaming source, etc., that can provide UE 205 with content which is requested by the user. Communications between sponsor network device 170 and UEs 205 may be performed through ePC 212 and eUTRAN 214 as shown for UE 205-A, or through WiFi WAP 225 as shown for UE 205-B. The communications between sponsor network device 170 and UE 205 may be channel agnostic, and thus may be performed using any known wireless and/or wired channels, or combinations thereof. Accordingly, other methods for communication between sponsor network device 170 and UE 205 may be used which are not illustrated in FIG. 2.

Content network device 180 may be any type of web server, media repository, streaming source, etc., that may optionally provide UE 205 with content which is requested by the user. A content network device 180 may provide any form of media, text, audio, image, video, etc., which can be requested by the user through UE 205. Moreover, content network device 180 may provide simultaneous broadcast of data to a plurality of UEs 205 using simulcast and/or multicast techniques, such as, for example, any type of multimedia broadcast multicast service (MBMS) and/or evolved MBMS (eMBMS) over LTE. In one embodiment, UE 205 may provide a request for SDS to content network device 180 over wireless network 210. The request for sponsored data access may be initially received by the eUTRAN 214, and then forwarded through gateways SGW 240 and PGW 270 to content network device 180. Content network device 180 may exchange information with other network devices, such as, for example, validation device 160 and/or sponsor network device 170, using a standard TCP/IP interface with IP network 250.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
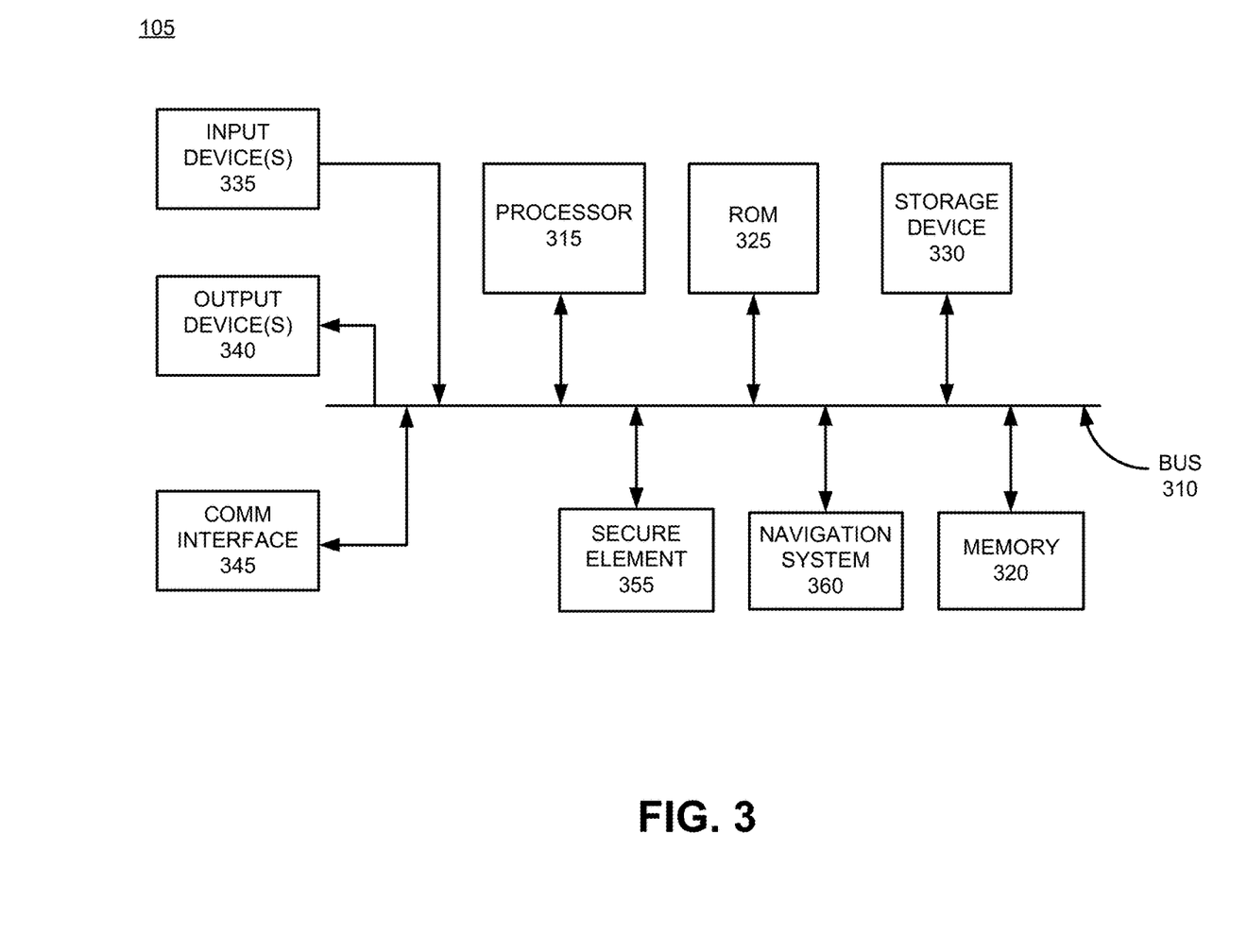
FIG. 3 is a block diagram showing exemplary components of a mobile device according to an embodiment.

FIG. 3 is a block diagram showing exemplary components of mobile device 105 according to an embodiment. Mobile device 105 may include a bus 310, a processor 315, memory 320, a read only memory (ROM) 325, a storage device 330, one or more input device(s) 335, one or more output device(s) 340, a communication interface 345, Secure Element (SE) 355, and navigation system 360. Bus 310 may include a path that permits communication among the elements of mobile device 105.

Processor 315 may include a processor, microprocessor, or processing logic that may interpret and execute instructions. Memory 320 may include a random access memory (RAM) or another type of dynamic storage device that may store information and instructions for execution by processor 315. ROM 325 may include a ROM device or another type of static storage device that may store static information and instructions for use by processor 315. Storage device 330 may include a solid state, magnetic and/or optical recording medium.

Input device(s) 335 may include one or more mechanisms that permit an operator to input information to mobile device 105, such as, for example, a keypad or a keyboard, a microphone, voice recognition, components for a touchscreen, and/or biometric mechanisms, etc. Output device(s) 340 may include one or more mechanisms that output information to the operator, including a display (e.g., a liquid crystal display), a speaker, etc. Communication interface 345 may include any transceiver mechanism that enables mobile device 105 to communicate with other devices and/or systems via, for example, radio frequency communications. For example, communication interface 345 may include mechanisms for communicating with another device or system via a network, such as wireless network(s) 110.

Secure Element (SE) 355 may be inserted into a secure element interface (I/F) (e.g., a smart card or Subscriber Identifier Module (SIM) card interface) of mobile device 105. SE 355 may store secure applications and data to permit mobile device 105 to perform trusted exchanges with other network entities. In alternative embodiments, SE 355 may be permanently coupled to mobile device 105, and thus cannot be removed by a user. SE 355 may include, for example, a Universal Integrated Circuit Card (UICC), a removable user identity module (R-UIM), a subscriber identity module (SIM), a universal subscriber identity module (USIM), or an Internet Protocol (IP) multimedia services identity module (ISIM).

In general, SE 355 provides a tamper-resistant platform (e.g., a single-chip secure microcontroller) capable of securely hosting applications and their associated confidential and/or cryptographic data (e.g., key management) in accordance with the rules and security requirements set forth by a set of well-identified trusted authorities. SE 355 may be capable of securely storing applications (hereinafter referred to as "secure applications") and cryptographic data (such as, for example, secure keys). The secure information stored in SE 355 may be managed in accordance with rules and security requirements provided by established trusted authorities. Accordingly, SE 355 provides the security and confidentiality required to perform validation of a user's identity for SDS access to networking system 200, and/or support trusted exchanges among various network entitles over networking system 200.

Navigation system 360 may be any system that provides position data in an absolute reference (e.g., a satellite navigation system (SNS) receiver providing position data in the WGS-84 system) and/or relative reference(s) (e.g., accelerometers). When deriving positions, navigation system 360 may utilize a receiver specifically designed for use with the SNS that extracts position, using conventional techniques, from a plurality of signals transmitted by SNS satellites. Various SNS may be used, which typically include a system of transmitters positioned to enable mobile device 105 to determine its location based on signals received from the transmitters. In a particular example, such transmitters may be located within Earth orbiting satellites. For example, a satellite in a constellation of Global Navigation System (GNS) such as Global Positioning System (GPS), Galileo, or Glonass may transmit a signal marked with a Pseudorandom Noise (PN) code that may be distinguishable from PN codes transmitted by other satellites in the constellation.

Mobile device 105 may perform certain operations or processes, as may be described in detail below. Mobile device 105 may perform these operations in response to processor 315 executing software instructions contained in a computer-readable medium, such as memory 320 and/or storage device 330. A computer-readable medium may be defined as a physical or logical memory device. A logical memory device may include memory space within a single physical memory device or spread across multiple physical memory devices. The software instructions may be read into memory 320 from another computer-readable medium, such as storage device 330, or from another device via communication interface 345. The software instructions contained in memory 320 may cause processor 315 to perform operations or processes that will be described in detail with respect to FIG. 5. Alternatively, hardwired circuitry may be used in place of or in combination with software instructions to implement processes consistent with the principles of the embodiments. Thus, exemplary implementations are not limited to any specific combination of hardware circuitry and software. The configuration of components of mobile device 105 illustrated in FIG. 3 is for illustrative purposes only. It should be understood that other configurations may be implemented. Therefore, mobile device 105 may include additional, fewer and/or different components than those depicted in FIG. 3.

Figure 4:
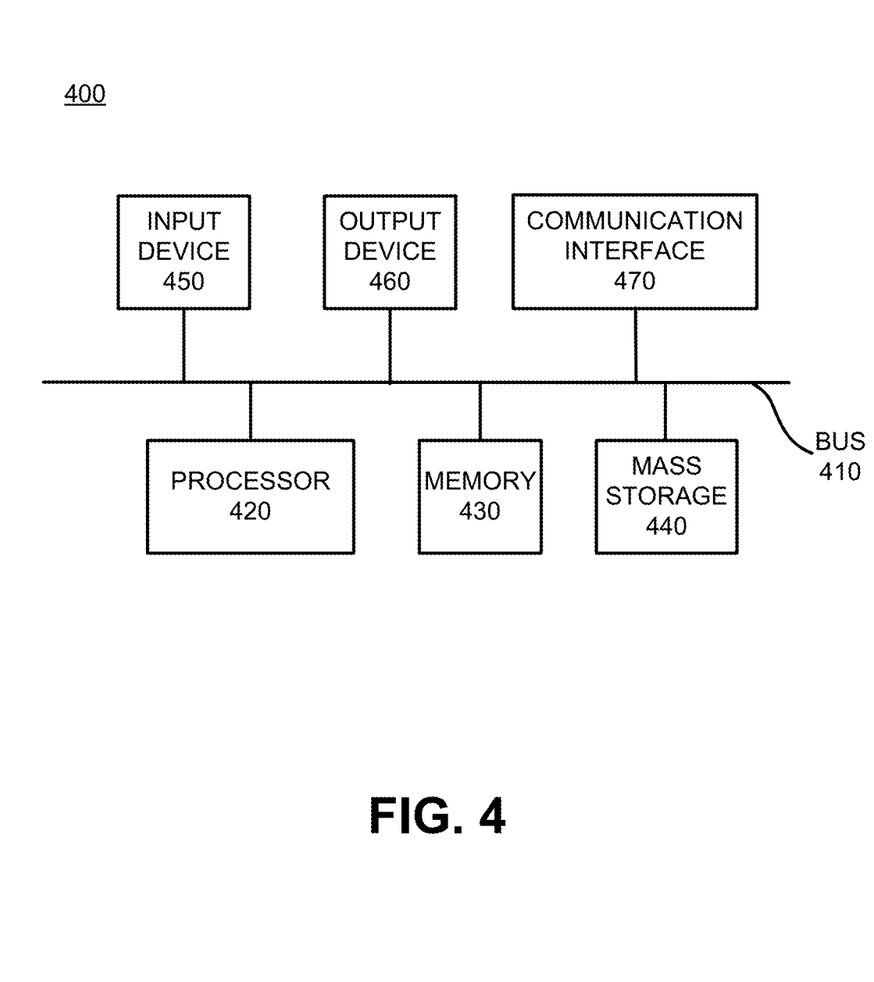
FIG. 4 is a block diagram showing exemplary components of a sponsor network device, a validation device and/or a content network device according to an embodiment.

FIG. 4 is a block diagram showing exemplary components of a network element 400 which may include a validation device 160, sponsor network device 170, and/or a content network device 180, according to an embodiment. Network element 400 may include a bus 410, a processor 420, a memory 430, mass storage 440, an input device 450, an output device 460, and a communication interface 470.

Bus 410 includes a path that permits communication among the components of network element 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux. Processor 420 may also use high-level analysis software packages and/or custom software written in any programming and/or scripting languages for interacting with other network entities are communicatively coupled to WAN 150.

Memory 430 may include any type of dynamic storage device that may store information and/or instructions, for execution by processor 420, and/or any type of non-volatile storage device that may store information for use by processor 420. For example, memory 430 may include a RAM or another type of dynamic storage device, a ROM device or another type of static storage device, and/or a removable form of memory, such as a flash memory. Mass storage 440 may include any type of on-board device suitable for storing large amounts of data, and may include one or more hard drives, solid state drives, and/or various types of redundant array of independent disks (RAID) arrays. For sponsor network device 160 and/or content network device 180, mass storage 440 may be suitable for storing files associated with sponsored data. For validation device 160, mass storage 440 may store databases storing information regarding campaigns, including their associated attributes and parameters which may be provided by sponsor network device 170, and information regarding sponsors and/or accounts.

Input device 450, which may be optional, can allow an operator to input information into network device 400, if required. Input device 450 may include, for example, a keyboard, a mouse, a pen, a microphone, a remote control, an audio capture device, an image and/or video capture device, a touch-screen display, and/or another type of input device. In some embodiments, network device 400 may be managed remotely and may not include input device 450. Output device 460 may output information to an operator of network device 400. Output device 460 may include a display (such as a liquid crystal display (LCD)), a printer, a speaker, and/or another type of output device. In some embodiments, network device 400 may be managed remotely and may not include output device 460.

Communication interface 470 may include a transceiver that enables network device 400 to communicate within network 115 with other devices and/or systems. Communication interface 470 may be configured to exchange data with WAN 150 over wired communications (e.g., conductive wire, twisted pair cable, coaxial cable, transmission line, fiber optic cable, and/or waveguide, etc.), or a combination of wired and/or wireless channels. In other embodiments, communication interface 470 may interface with wide area network 150 using a wireless communications channel, such as, for example, radio frequency (RF), infrared, and/or visual optics, etc. Communication interface 470 may include a transmitter that converts baseband signals to RF signals and/or a receiver that converts RF signals to baseband signals. Communication interface 470 may be coupled to one or more antennas for transmitting and receiving RF signals. Communication interface 470 may include a logical component that includes input and/or output ports, input and/or output systems, and/or other input and output components that facilitate the transmission/reception of data to/from other devices. For example, communication interface 470 may include a network interface card (e.g., Ethernet card) for wired communications and/or a wireless network interface (e.g., a WiFi) card for wireless communications. Communication interface 470 may also include a universal serial bus (USB) port for communications over a cable, a Bluetooth® LE wireless interface, a (radio frequency identity) RFID interface, a near field communication (NFC) wireless interface, and/or any other type of interface that converts data from one form to another form.

As described below, network device 400 may perform certain operations relating to targeting users for sponsored content when embodied as validation device 160, establishing campaigns and/or providing sponsored content to mobile device 105 when embodied as sponsor network device 170, and/or optionally providing sponsored content when enabled as content network device 180. Network element 400 may perform these operations in response to processor 420 executing software instructions contained in a computer-readable medium, such as memory 430 and/or mass storage 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of network element 400, in other implementations, network element 400 may include fewer components, different components, additional components, or differently arranged components than depicted in FIG. 4.

Figure 5:
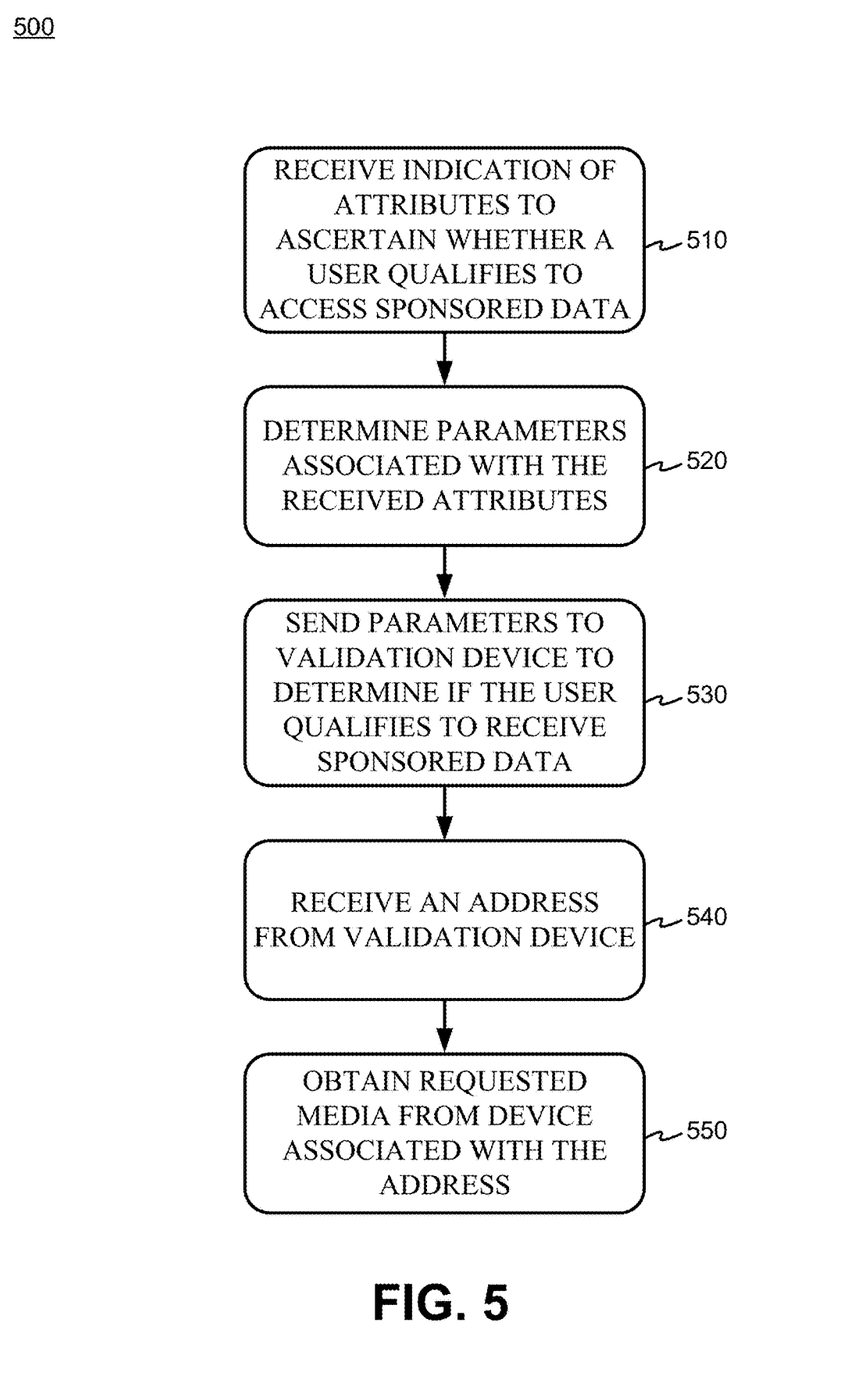
FIG. 5 is a flow chart showing an exemplary process for facilitating the selective targeting of users for access to a sponsored data service.

FIG. 5 is a flow chart showing an exemplary process 500 for facilitating the selective targeting of users for access to a sponsored data service. Process 500 may be performed by mobile device 105, for example, where processor 315 may execute instructions stored in memory 320, ROM 325, and/or storage device 330. Mobile device 105 may initially receive information identifying attributes to ascertain whether a user qualifies to access sponsored data (Block 510). In some embodiments, the attributes may be received automatically by mobile device 105 without user intervention. Alternatively, in other embodiments, attributes may be received in response to a user initiating an action on the graphical user interface (GUI) of mobile device 105.

For embodiments where the attributes are received automatically, mobile device 105 may initially monitor state(s) associated with mobile device 105, and send the state(s) to validation device 160 via network 115. Validation device 160 may evaluate the state(s) of mobile device 105, and determine appropriate sponsored data services based on the state(s) of mobile device 105. Validation device 160 may further determine the attributes appropriate for the determined sponsored data services. Mobile device 105 may then automatically receive the determined attributes from validation device 160 based on the state(s). The states may include aspects of mobile device 105, such as, for example, the position of mobile device 105, the application which a user is running, etc. Note that states may in some instances be similar to attributes, however, the attributes are provided to mobile device 105 to determine eligibility for sponsored data. The states may be thought of as a precursor, where the states may be used to determine what sponsored data plans may be considered for selection by validation device 160. Once the appropriate sponsored data service(s) are narrowed down and determined based on the states of mobile device 105, validation device 160 may automatically provide mobile device 105 with the attributes appropriate to the sponsored data service(s) determined by validation device 160.

Further referring to Block 510, for embodiments where the attributes are received in response to a user action, mobile device 105 may initially receive information identifying and/or describing at least one offered SDS. In one embodiment, the trigger for presenting the choices may be based on the state of mobile device 105. In another embodiment, the trigger may be a request initiated manually by the user through the GUI of mobile device 105. Mobile device 105 may then present, within the user interface of mobile device 105, user options to select an SDS from one or more offered SDS(s). Mobile device 105 may then receive a selection, via the user interface, of one of the at least one offered SDS, and send an indication of the selected SDS to validation device 160. In response, validation device 160 may determine the appropriate attributes for the selected SDS. Mobile device 105 may receive from validation device 160 an acknowledgement of access to the selected SDS. Moreover, mobile device 105 may receive receiving information identifying additional attributes, from validation device 160, associated with the selected SDS. Mobile device 105 may determine additional parameters associated with the additional attributes. Mobile device 105 may then send the additional parameters to validation device 160. Validation device 160 may determine, based on the additional parameters, whether the user qualifies to receive sponsored data via the SDS which was selected by the user.

In an embodiment, the attributes used to determine whether a user qualifies to access sponsored data may be associated with mobile device 105, where mobile 105 may be used to determine the parameters associated with the attributes based on one or more APIs residing within mobile device 105. Such attributes may include a position of mobile device 105, a proximity of mobile device 105 to a specified location, a time and/or day of access to the SDS, a date of access to the SDS, capabilities of mobile device 105, a make and/or a model identification of mobile device 105, an identification of applications residing on mobile device 105, the type and/or version of the operating system associated with mobile device 105, types of wireless networking channels available to mobile device 105, information residing in identified applications, browsing history of mobile device 105, purchase history of mobile device 105, and/or identification of at least one of clubs, groups, or organizations associated with user of mobile device 105.

In another embodiment, the attributes discussed used to determine whether a user qualifies to access sponsored data may "network-centric," that is, attributes which are associated with network 115, where network provider elements (e.g., account servers, validation device 160, etc.) may be used to determine the parameters associated with the attributes based on one or more APIs residing within devices associated with network 115. Such attributes may include an identity and/or a type of a plan to which the user may be subscribed, an amount of data available in the plan for a current billing period, whether the user is a subscriber to the network, whether the user has credits or coupons associated with plan, or whether there is a limit on a total number of number of users accessing the SDS, and/or a total amount of data users may access/exchange via the SDS. The type of plan may include whether the user has unlimited data, whether the user is a member of a family plan, the number of devices in the plan, etc.

Further referring to FIG. 5, mobile device 105 may determine parameters associated with the attributes (Block 520). As noted above, each attribute may be associated with one or more parameters, where the parameters may be a numerical, text, and/or logical value. The attributes may be thought of as variables having names descriptive of the quantities their associated parameters represent, such as, for example, "DEVICE POSITION." Once the parameters are determined, mobile device 105 may send the parameters to validation device 160, where validation device 160 may determine, based on the parameters, whether the user qualifies to receive sponsored data (Block 530). In an embodiment, sending the parameters may include having mobile device 105 monitor parameter(s) associated with an attribute, determine whether the monitored parameter is within a threshold, and provide automatically provide the parameter to validation device 160 in response to identifying that the monitored parameter is within (or exceeds, depending upon the parameter) a threshold.

Once validation device 160 approves the user for sponsored content, mobile device 105 may then receive a network address from validation device 160 (Block 540). The network address may include a hypertext transport protocol (HTTP) uniform resource locator (URL) which provides a network location for the sponsored content. The network address may be associated with sponsor network device 170 and/or content network device 180. In an embodiment, mobile device 105 may further receive an SDS identifier, along with the network address. The SDS identifier may include sponsor account identification, a network address for third party payment, a security signature, parameters for data accounting, and/or parameters for billing the requested sponsored data.

Upon receiving the network address, mobile device 105 may access sponsored data accessing sponsored data from a device associated with the received network address (Block 550).

Figure 6:
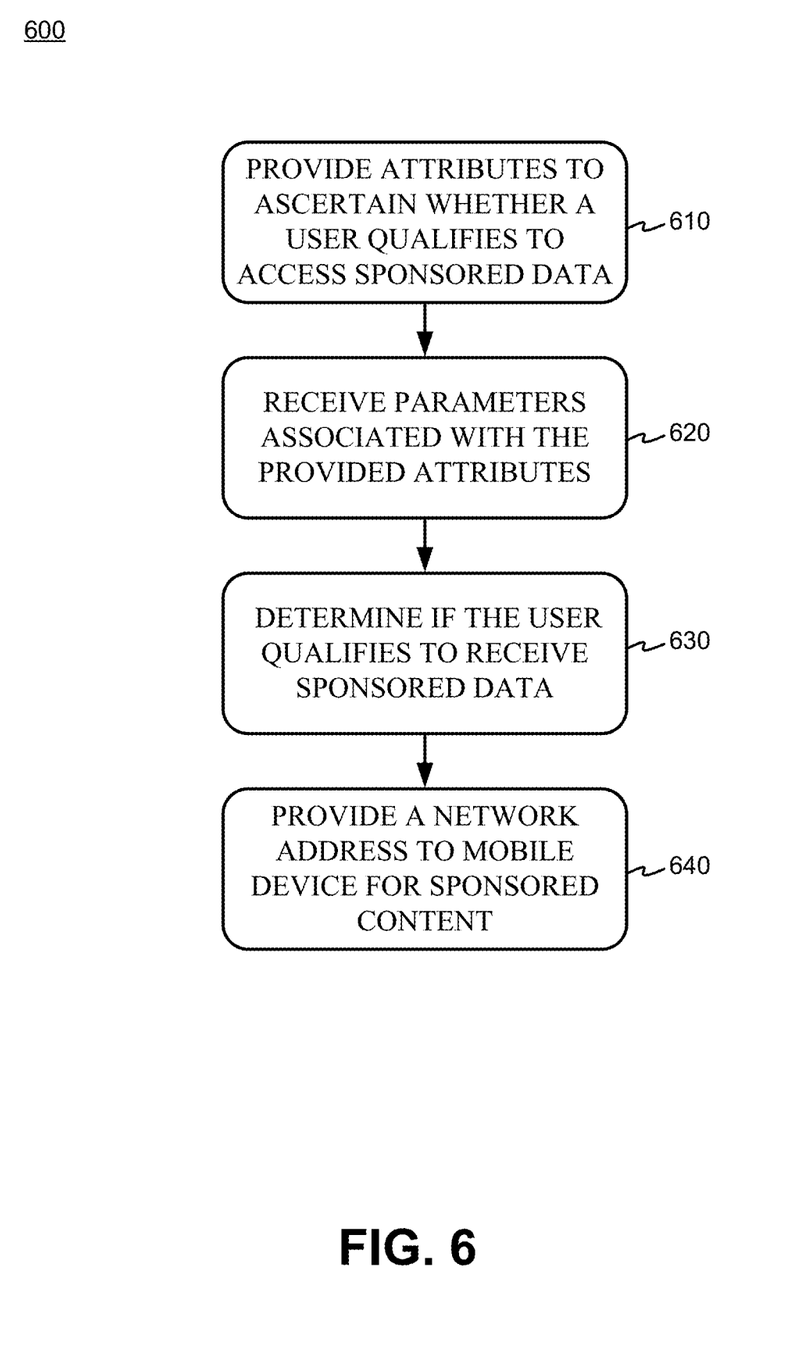
FIG. 6 is a flow chart showing an exemplary process for providing data access to a sponsored data service via selective user targeting.

FIG. 6 is a flow chart showing an exemplary process 600 for providing mobile device 105 access to a sponsored data service via selective user targeting. Process 600 may execute on one or more devices associated with network 115, and may include validation device 160. In an embodiment, validation device 160 may provide attributes to mobile device 105 which may ascertain whether a user qualifies for access to sponsored data (Block 610). In response, mobile device 105 may send parameters that are associated with the provided attributes. Validation device 160 may then receive the parameters via network 115 (Block 620).

Validation device 160 may then determine whether the user qualifies to receive sponsored data (Block 630). This determination may be based the parameters received from mobile device 105. In addition, other network-centric attributes may also factor in the determination for the user qualifying for sponsored data. The parameters for the network-centric attributes may be determined from any device in network 115, and may include information from databases having customer account information. Upon determining that the user qualifies for sponsored data in Block 630, the validation device 160 may provide a network address to mobile device 105 which is associated with a device which hosts and provides the sponsored content (Block 640). The network address may be associated with sponsor network device 170 and/or content network device 180.

Figure 7A:
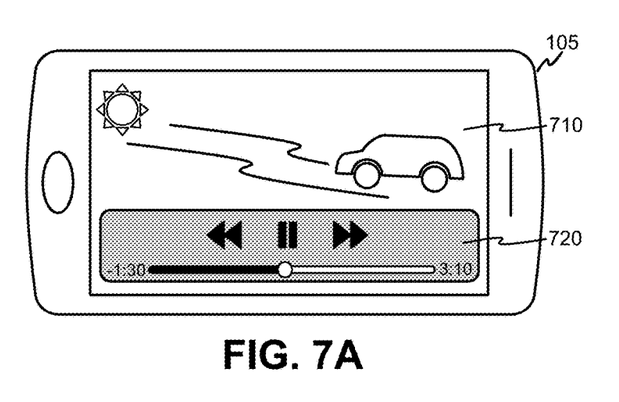
FIGS. 7A and 7B are diagrams showing exemplary mobile device displays along with an example advertisement supporting a sponsored data service.
Figure 7B:
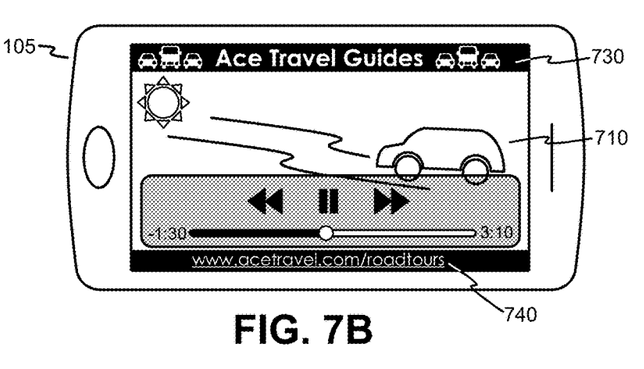

FIGS. 7A and 7B are diagrams depicting different modes of an exemplary display of a mobile device 105 which may include an indication of a sponsor providing the SDS. In an embodiment, the user of mobile device 105 may have to agree terms of service before receiving sponsored content. One item the user may agree to is that advertising may be provided to mobile device 105 in return for receiving sponsored content. Such adverting may indicate the name and contact information of the sponsor, which may be especially useful if the source for the sponsored content is a different website (or application) that is associated with the sponsor. For example, if the sponsored content were provided by any third party source (e.g., content network device 180), the name and/or contact information of the sponsor may be provided.

For example, as shown in FIG. 7A mobile device 105 may receive video data relating to a vacation destination which may be played on display 710 and controlled using controls 720. Display 710 may show an advertisement prior to the video starting, and/or after the video ends, which identifies the sponsor supporting the sponsored content. However, such approaches may have the disadvantage of delaying the showing of the video when the advertisement is displayed prior to showing the video. Alternatively, the user may easily skip the advertisement when it is shown after the video has been played.

FIG. 7B shows another embodiment where the advertising indicating identity of the sponsor may be displayed as a graphics overlay 730 onto the content normally displayed by mobile device 105. Graphics overlay 730 may include graphics, text, and/or an associated URL 740 for the sponsor's website. The advertising overly may be any type of multimedia and or interactive data which can be provided to mobile device 105 for exposure to the user, such as, for example, audio, video, image, animation, and/or user interface elements which respond to the user's input. The user's input may be provided via a touch screen (including virtual keyboard), microphone, camera, motion, light, and/or other sensors found on mobile devices.

For example, as shown in FIG. 7B, mobile display 710 shows overlay 730 bordering graphics content which is normally displayed by mobile device 105, but may be reduced in size to accommodate overlay 730. Graphics overly 730 may display any content relating to the sponsor's identity, and information about products, services, and promotions. The overlay may be dynamic and respond to user input (for example, touch input), and its content may change over time and/or in response to user inputs.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5 and 6, the order of the blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method for accessing a sponsored data service (SDS) via a mobile device, comprising:
receiving information identifying attributes to ascertain whether a user qualifies to access sponsored data, wherein an attribute from the identified attributes includes at least one of a position of the mobile device or a time of access to the SDS, wherein the information identifying attributes are associated with at least one of: a proximity of the mobile device to a specified location, a date of access to the SDS, capabilities of the mobile device, a make or model identification of the mobile device, an identification of applications residing on the mobile device, types of wireless networking channels available to the mobile device, internet browsing history, user purchasing, buying history, information residing in identified applications, or identification of at least one of clubs, groups, or organizations associated with the user;
determining parameters associated with the attributes;
sending the parameters to a validation device, wherein the validation device determines, based on the parameters, whether the user qualifies to receive sponsored data;
receiving a network address from the validation device, in response to the validation device determining that the user qualifies to receive sponsored data; and
accessing sponsored data from a device associated with the network address.

2. The method of claim 1, wherein sending the parameters associated with the attributes comprises:
monitoring at least one parameter associated with an attribute;
determining whether the monitored parameter is within a threshold; and
automatically providing the parameter to the validation device in response to identifying that the monitored parameter is within the threshold.

3. The method of claim 2, wherein receiving the information identifying attributes to ascertain whether a user qualifies to access sponsored data comprises:
monitoring at least one state associated with the mobile device;
sending the at least one state to the validation device; and
automatically receiving the information identifying the attributes from the validation device based on the at least one state.

4. The method of claim 2, wherein receiving the information identifying attributes to ascertain whether a user qualifies to access sponsored data comprises:
receiving information identifying at least one offered SDS;

presenting, within a user interface on the mobile device, user options to select an SDS from the at least one offered SDS;
receiving a selection, via the user interface, of one of the at least one offered SDS;
sending an indication of the selected SDS to the validation device; and
receiving, from the validation device, an acknowledgement of access to the selected SDS.

5. The method of claim 4, wherein receiving, from the validation device, an acknowledgement of access to the selected SDS further comprises:
receiving information identifying additional attributes, from the validation device, associated with the selected SDS;
determining additional parameters associated with the additional attributes; and
sending the additional parameters to the validation device, wherein the validation device determines, based on the additional parameters, whether the user qualifies to receive sponsored data via the selected SDS.

6. The method of claim 1, wherein the validation device determines whether the user qualifies to receive sponsored data based on network-centric attributes which are based on at least one of an identity or a type of a plan to which the user is subscribed, an amount of data available in the plan for a current billing period, whether the user is a subscriber to the network, whether the user has credits or coupons associated with plan, or whether there is a limit on at least one of a total number of number of users having access to the SDS or a total amount of data which may be accessed via the SDS.

7. The method of claim 2, wherein the network address includes a hypertext transport protocol (HTTP) uniform resource locator (URL) associated with at least one of a sponsor network device or a content network device.

8. The method of claim 1, further comprising:
receiving an SDS identifier, along with the network address, wherein the SDS identifier includes at least one of sponsor account identification, a network address for third party payment, a security signature, parameters for data accounting, or parameters for billing the requested sponsored data.

9. A mobile device, comprising:
an interface configured to communicate with a network;
a memory configured to store instructions; and
a processor, coupled to the interface and the memory, wherein the stored instructions cause the processor to:
receive information identifying attributes to ascertain whether a user qualifies to access sponsored data, wherein an attribute from the identified attributes includes at least one of a position of the mobile device or a time of access to a sponsored data service (SDS), wherein the information identifying attributes are associated with at least one of: a proximity of the mobile device to a specified location, a date of access to the SDS, capabilities of the mobile device, a make or model identification of the mobile device, an identification of applications residing on the mobile device, types of wireless networking channels available to the mobile device, internet browsing history, user purchasing, buying history, information residing in identified applications, or identification of at least one of clubs, groups, or organizations associated with the user,
determine parameters associated with the attributes,
send the parameters to a validation device, wherein the validation device determines, based on the parameters, whether the user qualifies to receive sponsored data,
receive a network address from the validation device, in response to the validation device determining that the user qualifies to receive sponsored data, and
access sponsored data from a device associated with the network address.

10. The mobile device of claim 9, wherein the instructions to send the parameters associated with the attributes further cause the processor to:
monitor at least one parameter associated with an attribute,
determine whether the monitored parameter is within a threshold, and
automatically provide the parameter to the validation device in response to identifying that the monitored parameter is within the threshold.

11. The mobile device of claim 10, wherein the instructions to receive information identifying attributes to ascertain whether a user qualifies to access sponsored data further cause the processor to:
monitor at least one state associated with the mobile device,
send the at least one state to the validation device, and
automatically receive the information identifying the attributes from the validation device based on the at least one state.

12. The mobile device of claim 10, wherein the instructions to receive the information identifying the attributes to ascertain whether a user qualifies to access sponsored data further causes the processor to:
receive information identifying at least one offered SDS,
present, within a user interface on the mobile device, user options to select an SDS from the at least one offered SDS,
receive a selection, via the user interface, of one of the at least one offered SDS,
send an indication of the selected SDS to the validation device, and
receive, from the validation device, an acknowledgement of access to the selected SDS.

13. The mobile device of claim 12, wherein the instructions to receive, from the validation device, an acknowledgement of access to the selected SDS further causes the processor to:
receive information identifying additional attributes, from the validation device, associated with the selected SDS;
determine additional parameters associated with the additional attributes; and
send the additional parameters to the validation device, wherein the validation device determines, based on the additional parameters, whether the user qualifies to receive sponsored data via the selected SDS.

14. The mobile device of claim 9, wherein the validation device determines whether the user qualifies to receive sponsored data based on network-centric attributes which are based on at least one of an identity or a type of a plan to which the user is subscribed, an amount of data available in the plan for a current billing period, whether the user is a subscriber to the network, whether the user has credits or coupons associated with plan, or whether there is a limit on at least one of a total number of number of users having access to the SDS or a total amount of data which may be accessed via the SDS.

15. The mobile device of claim 9, wherein the network address includes a hypertext transport protocol (HTTP) uniform resource locator (URL) associated with at least one of a sponsor network device or a content network device.

16. The mobile device of claim 9, further comprising:
receiving an SDS identifier, along with the network address, wherein the SDS identifier includes at least one of sponsor account identification, a network address for third party payment, a security signature, parameters for data accounting, or parameters for billing the requested sponsored data.

17. A non-transitory computer-readable medium comprising instructions, which, when executed by a processor, cause the processor to:
receive information identifying attributes to ascertain whether a user qualifies to access sponsored data via a mobile device, wherein an attribute from the identified attributes includes at least one of a position of the mobile device or a time of access to a sponsored data service (SDS) wherein the information identifying attributes are associated with at least one of: a proximity of the mobile device to a specified location, a date of access to the SDS, capabilities of the mobile device, a make or model identification of the mobile device, an identification of applications residing on the mobile device, types of wireless networking channels available to the mobile device, internet browsing history, user purchasing, buying history, information residing in identified applications, or identification of at least one of clubs, groups, or organizations associated with the user;
determine parameters associated with the attributes;
send the parameters to a validation device, wherein the validation device determines, based on the parameters, whether the user qualifies to receive sponsored data;
receive a network address from the validation device, in response to the validation device determining that the user qualifies to receive sponsored data; and
access sponsored data from a device associated with the network address.

18. The non-transitory computer-readable medium of claim 17, wherein the instructions to send the parameters associated with the attributes further cause the processor to:
monitor a parameter associated with at least one attribute;
determine whether the monitored parameter is within a threshold; and
provide automatically the parameter to the validation device in response to identifying that the monitored parameter is within the threshold.

19. The method of claim 1, further comprising:
monitoring at least one parameter and at least one state associated with an attribute;
sending the at least one state to the validation device;
determining whether the at least one monitored parameter is within a threshold;
receiving the information identifying the attributes from the validation device based on the at least one state; and
providing the at least one parameter to the validation device in response to identifying that the at least one monitored parameter is within the threshold.

20. The mobile device of claim 9, wherein the instructions further cause the processor to:
monitor at least one parameter and at least one state associated with an attribute;
send the at least one state to the validation device;
determine whether the monitored at least one parameter is within a threshold;
receive the information identifying the attributes from the validation device based on the at least one state; and
provide the at least one parameter to the validation device in response to identifying that the at least one monitored parameter is within the threshold.

* * * * *